UNITED STATES PATENT OFFICE.

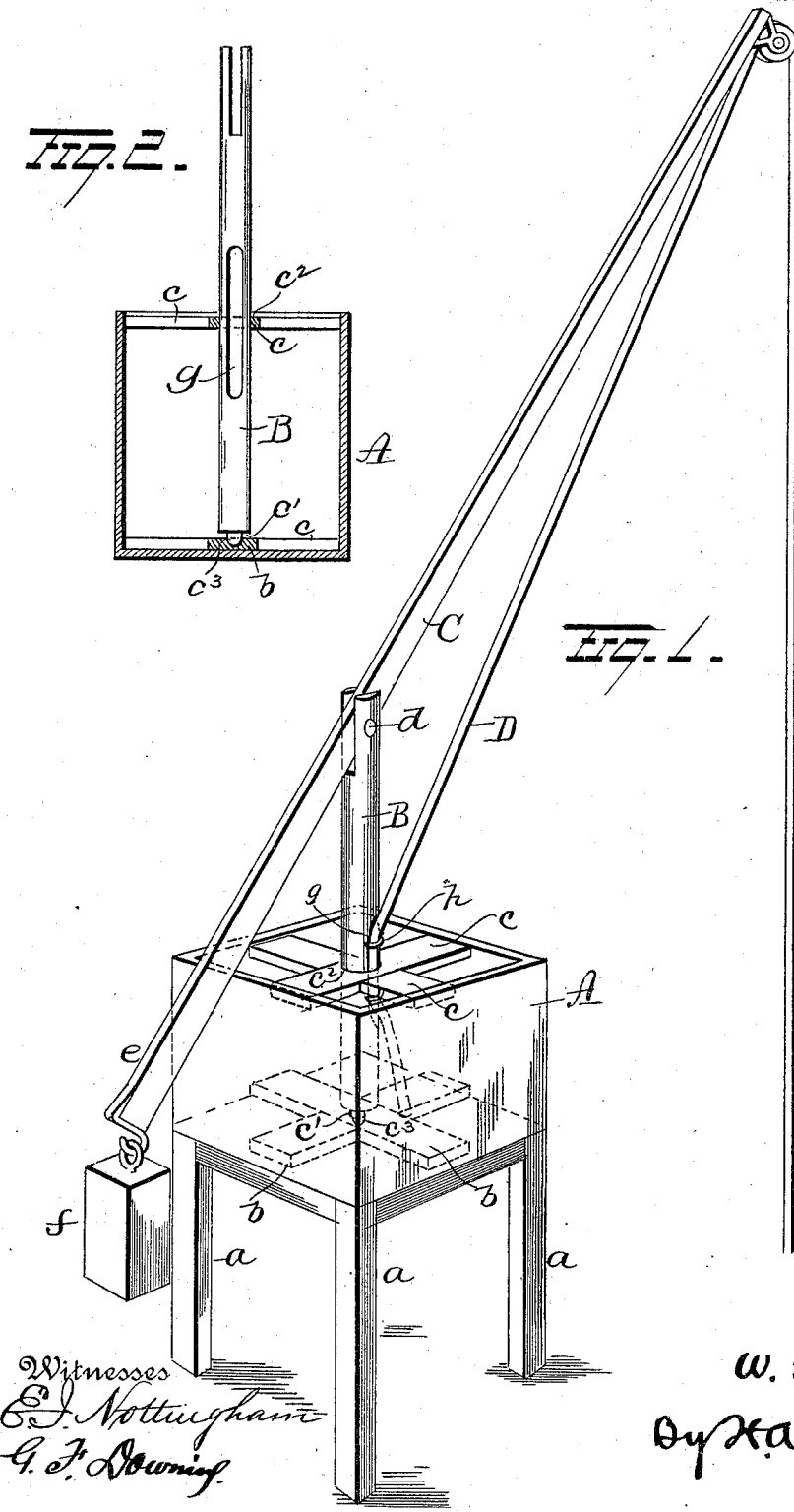

WILEY TURNER BOYD, OF BUSHNELL, FLORIDA.

WATER-DISTRIBUTION.

SPECIFICATION forming part of Letters Patent No. 535,130, dated March 5, 1895.

Application filed June 23, 1894. Serial No. 515,486. (No model.)

*To all whom it may concern:*

Be it known that I, WILEY TURNER BOYD, a resident of Bushnell, in the county of Sumter and State of Florida, have invented certain new and useful Improvements in Water-Distribution; and I do hereby declare the following to be a full, clear, and exact description of the invention, such as will enable others skilled in the art to which it appertains to make and use the same.

My invention relates to an improvement in water distribution and more particularly to devices for sprinkling gardens and orange groves,—the object of the invention being to produce simple and efficient means whereby a garden or grove may be sprinkled or watered with the expenditure of but little exertion.

With this object in view the invention consists in certain novel features of construction and combinations and arrangements of parts as hereinafter set forth and pointed out in the claims.

In the accompanying drawings: Figure 1 is a view illustrating an embodiment of my invention. Fig. 2 is a detail view.

A represents a tank supported about ten feet (more or less) from the ground, on suitable posts $a$, said tank being preferably located in proximity to a well from which it can be supplied with water by means of buckets or by a pump. In the top and bottom of the tank, cross bars $b$, $c$ are respectively located, the cross bars $b$ being made with a socket or perforation $c^3$, where they cross for the reception of a tenon $c'$ at the lower end of a post B, said post extending up through a perforation $c^2$ made in the bars $c$ where they cross. The upper end of the post B is bifurcated for the reception of a pole C, which is pivotally connected to said post by means of a suitable pin $d$. The pole C is made of considerable length and at the lower end of its short arm $e$ a weight $f$ is connected, said weight being just sufficient to counterbalance the pole and a hose D. One end of the hose D enters the tank and where it passes through the opening in the top of the tank it is inserted in a recess $g$ made in the post B, in which recess it is retained by means of staples $h$. From the tank A the hose extends to the outer or upper end of the pole C where it passes over a pulley $i$, and from the pulley the hose extends to the ground where it may be coiled more or less or run to a distance from the tank where it may be desired to discharge the water on plants. From this construction and arrangement of parts it will be seen that the arrangement of the hose will produce a siphon, so that when the water from the tank A is once started to flow through the hose it will continue until the tank becomes entirely emptied. The post B being revolubly mounted in the tank and the pole being pivoted to the post, these parts can be readily turned so as to cause the hose to extend in any desired direction.

My improvements are very simple in construction and effectual, in all respects, in the performance of their functions.

Slight changes might be made in the details of construction of my invention without departing from the spirit thereof or limiting its scope and hence I do not wish to limit myself to the precise details of construction herein set forth.

It is evident, that, if desired, the hose may be made comparatively short and at its end attached to a metal pipe through which the water will flow to the desired point.

Having fully described my invention, what I claim as new, and desire to secure by Letters Patent, is—

1. The combination with a tank and a post extending upwardly therefrom, of a pole pivoted to said post and weighted at one end, a pulley at the other end of said pole and a hose communicating with the tank and passed over said pulley, said hose being adapted to terminate at a point below the tank, substantially as set forth.

2. The combination with a tank, of a pole revolubly mounted therein, a pole pivoted to said post, a pulley at the outer end of said pole and a hose communicating with the tank, passing over the pulley and terminating at a point below the tank, substantially as set forth.

3. The combination with a tank having an opening in its top and a socket in its bottom, of a post mounted in said socket and passing through said perforation and having a recess where it passes through the perforation, a pole pivoted to the post and having a weight at one end, a pulley at the outer end of said pole, and a hose communicating with the tank, passing through the recess in the post, passing over the pulley on the pole and terminating below the tank, substantially as set forth.

4. The combination with a post and a tank supported on said post, of a post revolubly mounted in said tank and extending above the same, a pole pivoted between its ends to said post, a weight at the lower end of said pole, a pulley at the outer end of the pole, and a hose communicating with the tank, passing over said pulley and terminating below the tank, substantially as set forth.

In testimony whereof I have signed this specification in the presence of two subscribing witnesses.

WILEY TURNER BOYD.

Witnesses:
GEO. F. FOWLER,
C. A. WEBB.